(12) United States Patent
Shimanuki et al.

(10) Patent No.: US 9,774,233 B2
(45) Date of Patent: Sep. 26, 2017

(54) GENERATOR INCLUDING AN ALTERNATING CURRENT EXCITER AND A PLURALITY OF CONDUCTORS

(71) Applicant: KABUSHIKI KAISHA TOSHIBA, Minato-ku (JP)

(72) Inventors: Kenmei Shimanuki, Yokohama (JP); Hidetoshi Sugimura, Nakano-Ku (JP); Toru Otaka, Kawasaki (JP); Daisuke Hiramatsu, Ota-Ku (JP); Kazuma Tsujikawa, Kawasaki (JP); Wataru Nakamura, Yokohama (JP); Kazuki Sato, Kawasaki (JP); Kunitomi Niida, Fukushima (JP); Yutaro Arai, Koriyama (JP); Keiichiro Kimura, Fukushima (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 350 days.

(21) Appl. No.: 14/325,711

(22) Filed: Jul. 8, 2014

(65) Prior Publication Data

US 2015/0115780 A1    Apr. 30, 2015

(30) Foreign Application Priority Data

Oct. 30, 2013    (JP) .................................. 2013-225345

(51) Int. Cl.
*H02K 3/00* (2006.01)
*H02K 19/00* (2006.01)
(Continued)

(52) U.S. Cl.
CPC ........... *H02K 19/26* (2013.01); *H02K 11/042* (2013.01); *H02K 11/046* (2013.01); *H02K 19/38* (2013.01); *H02K 2203/06* (2013.01)

(58) Field of Classification Search
CPC ............................... H02K 19/26; H02K 19/38
(Continued)

(56) References Cited

U.S. PATENT DOCUMENTS

| 4,887,020 A | 12/1989 | Graham |
|---|---|---|
| 2004/0189131 A1 | 9/2004 | Lacaze |

FOREIGN PATENT DOCUMENTS

| JP | 56-56154 A | 5/1981 |
|---|---|---|
| JP | 56056154 A * | 5/1981 |

(Continued)

OTHER PUBLICATIONS

Combined Chinese Office Action and Search Report issued Aug. 9, 2016 in Patent Application No. 201410379463.3 (with English language translation).

(Continued)

*Primary Examiner* — Jose Gonzalez Quinones
(74) *Attorney, Agent, or Firm* — Oblon, McClelland, Maier & Neustadt, L.L.P.

(57) ABSTRACT

In one embodiment, a generator includes an alternating current exciter to output first, second and third alternating currents respectively having first, second and third phases, and a rotary rectifier to convert the first, second and third alternating currents into first, second and third direct currents, respectively. The generator further includes a rotating shaft on which the exciter and the rectifier are mounted, and plural conductors mounted on the shaft, and including one or more first conductors, one or more second conductors and one or more third conductors to respectively supply the first, second and third alternating currents from the exciter to the rectifier. The plural conductors include one or more conductor groups in each of which two or more conductors are collectively arranged, and each of the conductor groups (Continued)

includes the two or more conductors arranged to cancel a magnetic field around each conductor in the same group.

11 Claims, 7 Drawing Sheets

(51) Int. Cl.
    *H02K 19/26*     (2006.01)
    *H02K 11/04*     (2016.01)
    *H02K 19/38*     (2006.01)
    *H02K 11/042*     (2016.01)

(58) Field of Classification Search
    USPC .................................. 310/179, 180, 184, 162
    See application file for complete search history.

(56) References Cited

FOREIGN PATENT DOCUMENTS

| | | | |
|---|---|---|---|
| JP | 59-148554 A | | 8/1984 |
| JP | 59148554 A | * | 8/1984 |
| JP | 2010-98789 A | | 4/2010 |
| JP | 2010098789 A | * | 4/2010 |

OTHER PUBLICATIONS

Japanese Office Action issued Oct. 28, 2016 in Patent Application No. 2013-225345 (with English language translation).
Extended European Search Report issued on May 31, 2016 in European Patent Application No. 14176972.9.

* cited by examiner

GENERATOR INCLUDING AN ALTERNATING CURRENT EXCITER AND A PLURALITY OF CONDUCTORS

CROSS REFERENCE TO RELATED APPLICATION

This application is based upon and claims the benefit of priority from the prior Japanese Patent Application No. 2013-225345, filed on Oct. 30, 2013, the entire contents of which are incorporated herein by reference.

FIELD

Embodiments described herein relate to a generator.

BACKGROUND

A single unit capacity of a synchronous generator has increased with an increase of the demand for electric power in recent years. As the single unit capacity of the synchronous generator becomes larger, a field current required by a generator main body becomes larger, for example, to be several thousands of amperes. For this reason, the capacity and the size of an alternating current exciter for supplying the field current to the generator main body tends to increase.

Therefore, a brushless synchronous generator including the alternating current exciter and a rotary rectifier is attracting attention. When the brushless synchronous generator is a bipolar device, an excitation capacity of the brushless synchronous generator is about 1/100 to 1/300 of that of a conventional synchronous generator. Accordingly, the brushless synchronous generator has an advantage to easily increase the capacity of the generator. Furthermore, since the brushless synchronous generator includes no brush, the brushless synchronous generator has an advantage that generation of stains due to abrasion of the brush can be avoided.

DETAILED DESCRIPTION

Embodiments will now be explained with reference to the accompanying drawings.

In the brushless synchronous generator, the alternating current exciter and the rotary rectifier are mounted on the same rotating shaft, so that it is necessary to arrange conductors (three-phase conductors) that electrically connect the alternating current exciter and the rotary rectifier on the rotating shaft. In this case, the conductors are generally arranged at 120 degrees to each other as shown in FIGS. 7A and 7B.

Figure 7A:
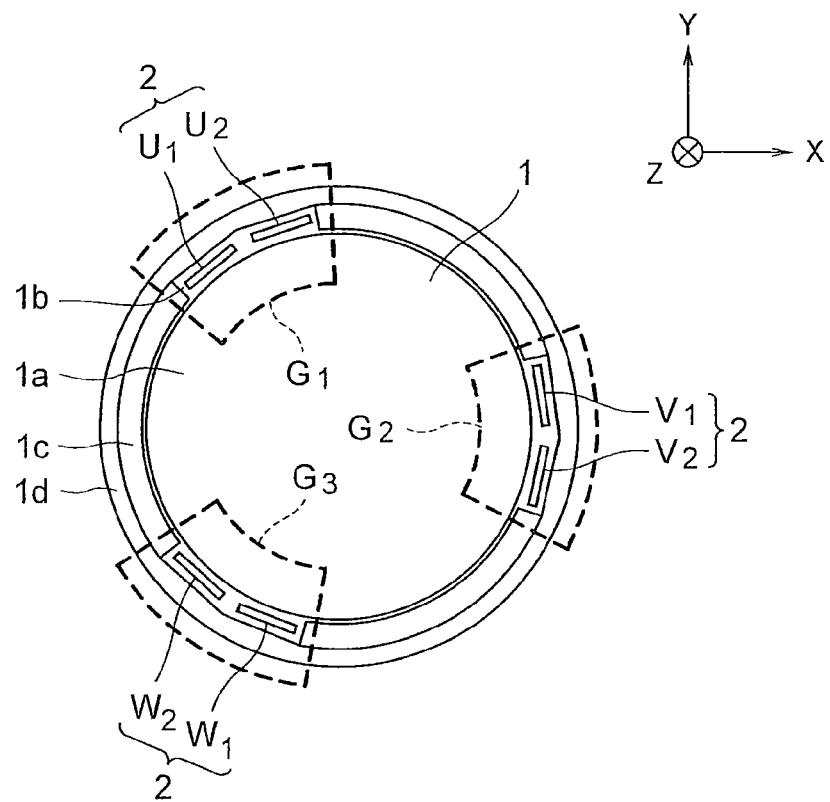
FIGS. 7A and 7B are cross-sectional views showing a conductor arrangement of a conventional brushless synchronous generator.
Figure 7B:
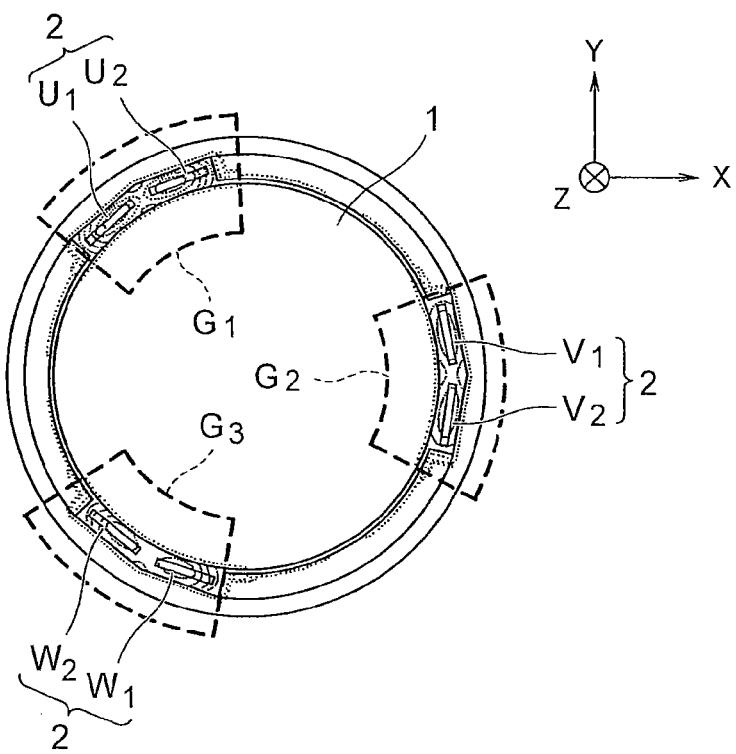

FIGS. 7A and 7B are cross-sectional views showing a conductor arrangement of a conventional brushless synchronous generator. FIG. 7A is a cross-sectional view showing a cross section of the brushless synchronous generator. FIG. 7B is a magnetic flux penetration line diagram corresponding to the cross-sectional view of FIG. 7A.

This generator includes a rotating shaft 1 on which an alternating current exciter and a rotary rectifier are mounted, and a plurality of conductors 2 arranged on the rotating shaft 1. These conductors 2 are collectively arranged for each conductor group $G_1$, $G_2$ and $G_3$. Specifically, two U-phase conductors $U_1$ and $U_2$ are collectively arranged as a U-phase group $G_1$, two V-phase conductors $V_1$ and $V_2$ are collectively arranged as a V-phase group $G_2$, and two W-phase conductors $W_1$ and $W_2$ are collectively arranged as a W-phase group $G_3$. The conductor groups $G_1$, $G_2$ and $G_3$ are arranged at 120 degrees to each other.

However, when large three-phase alternating currents flow in these conductors 2, the structure of the generator near the conductors 2 is heated by a magnetic field generated by induction of the currents. In some cases, an insulator 1b surrounding the conductors 2 may be damaged by the heat.

In one embodiment, a generator includes an alternating current exciter configured to output a first alternating current having a first phase, a second alternating current having a second phase, and a third alternating current having a third phase, and a rotary rectifier configured to convert the first, second and third alternating currents into first, second and third direct currents, respectively. The generator further includes a rotating shaft on which the alternating current exciter and the rotary rectifier are mounted, and a plurality of conductors mounted on the rotating shaft, and including one or more first conductors, one or more second conductors and one or more third conductors to respectively supply the first, second and third alternating currents from the alternating current exciter to the rotary rectifier. Furthermore, the plurality of conductors include one or more conductor groups in each of which two or more conductors are collectively arranged, and each of the conductor groups includes the two or more conductors arranged to cancel a magnetic field around each conductor in the same group.

First Embodiment

Figure 1:
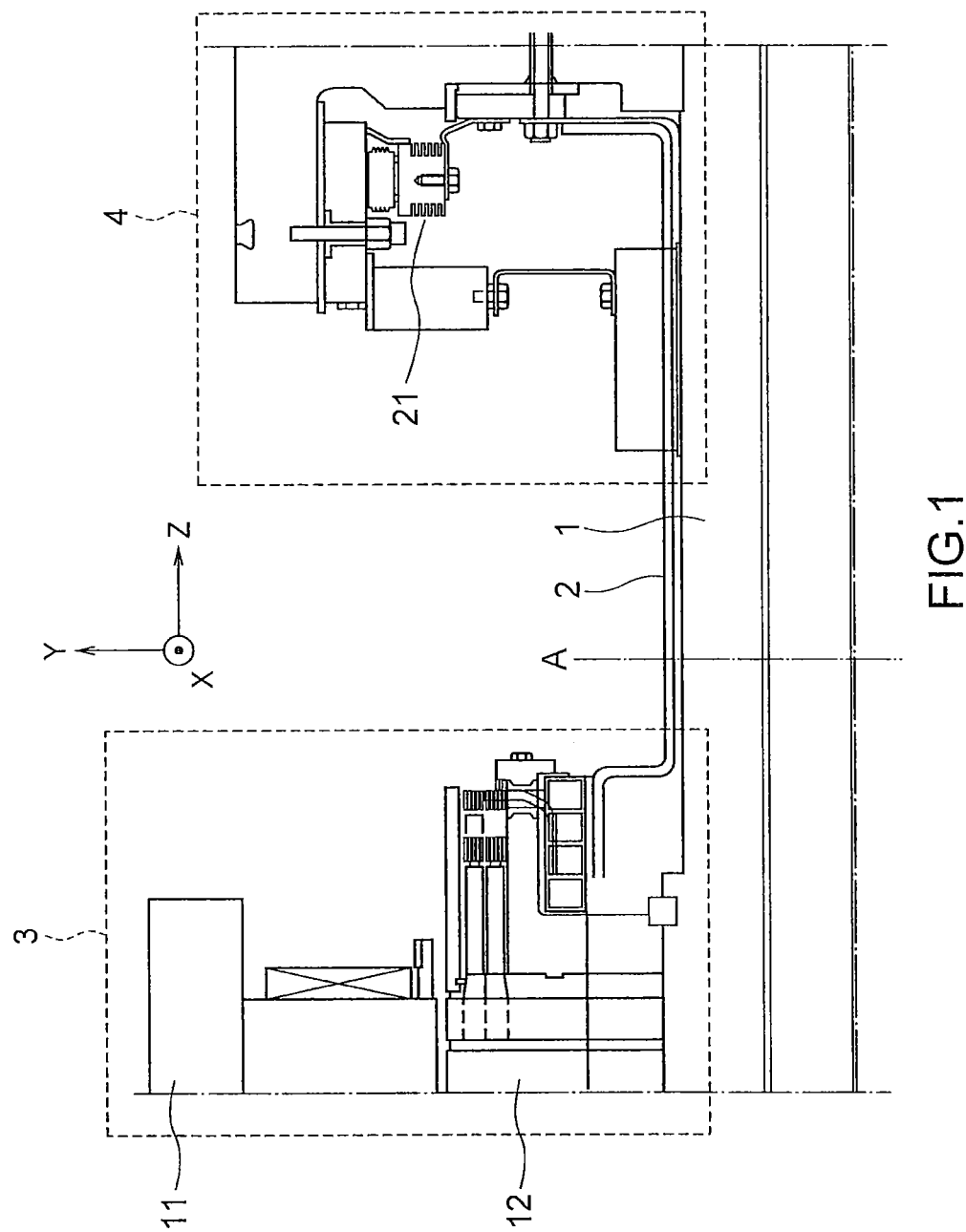
FIG. 1 is a cross-sectional view showing a structure of a generator of a first embodiment.

FIG. 1 is a cross-sectional view showing a structure of a generator of a first embodiment.

The generator in FIG. 1 is a brushless synchronous generator. The generator in FIG. 1 includes a rotating shaft 1, a plurality of conductors 2 arranged on the rotating shaft 1, an alternating current exciter 3 mounted on the rotating shaft 1, and a rotary rectifier 4 mounted on the rotating shaft 1. The alternating current exciter 3 and the rotary rectifier 4 are electrically connected by the conductors 2. The conductors 2 are three-phase conductors for supplying three-phase alternating currents from the alternating current exciter 3 to the rotary rectifier 4.

The alternating current exciter 3 includes a field unit 11 located on the stator side of the generator, and an armature unit 12 separated from the field unit 11 and located on the rotor side of the generator. The rotary rectifier 4 includes a rectifier element unit 21 including a plurality of rectifier elements. In the generator of the present embodiment, more specifically, the armature unit 12 of the alternating current exciter 3 is mounted on the rotating shaft 1, and the armature unit 12 and the rectifier element unit 21 are electrically connected by the conductors 2.

FIG. 1 shows X and Y directions which are perpendicular to each other and are perpendicular to the rotating shaft 1, and a Z direction which is parallel with the rotating shaft 1. The X and Z directions indicate a horizontal direction, and the Y direction indicates a vertical direction.

Figure 2:
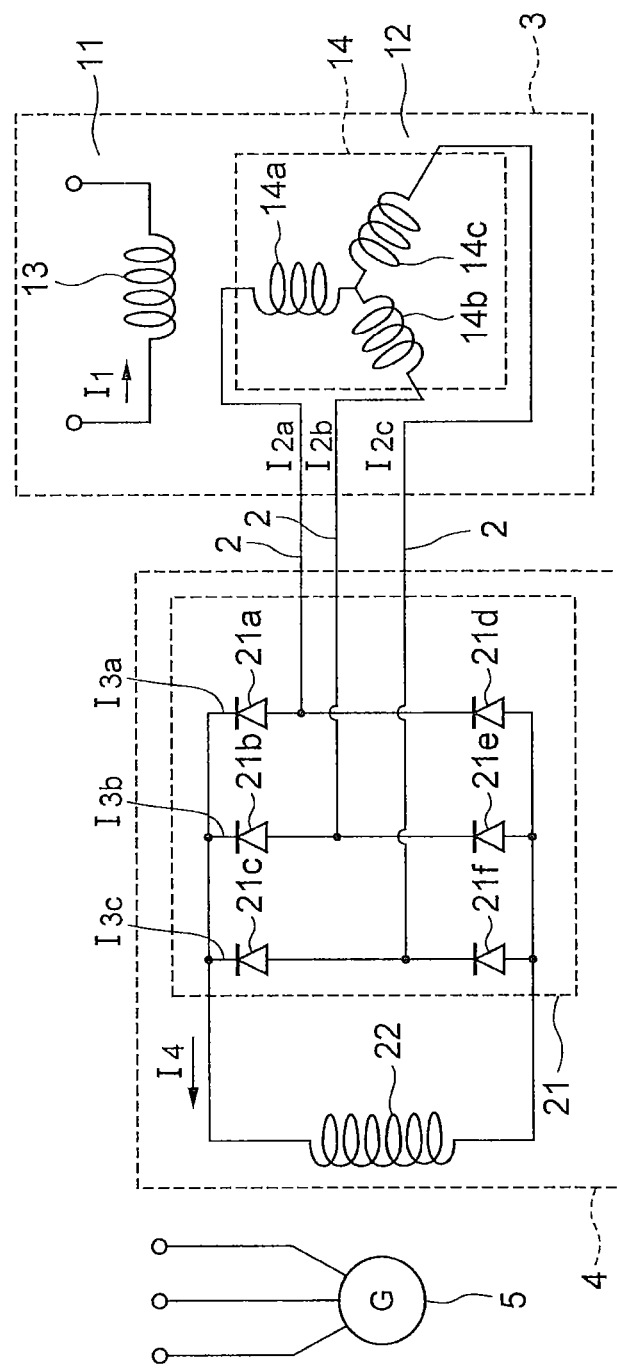
FIG. 2 is a circuit diagram showing a circuit configuration of the generator of the first embodiment.

FIG. 2 is a circuit diagram showing a circuit configuration of the generator of the first embodiment.

(1) Alternating Current Exciter 3

As shown in FIG. 2, the field unit 11 of the alternating current exciter 3 includes a field winding 13, and the armature unit 12 of the alternating current exciter 3 includes an armature winding 14 including first, second, and third windings 14a, 14b, and 14c. The first to third windings 14a to 14c are connected in Y shape.

When a direct current $I_1$ flows in the field winding 13 during rotation of the rotating shaft 1, three-phase alternating currents $I_{2a}$, $I_{2b}$ and $I_{2c}$ are generated in the armature winding 14 by the effect of a magnetic field generated by the direct current $I_1$. The alternating currents $I_{2a}$, $I_{2b}$ and $I_{2c}$ are respectively a U-phase current, a V-phase current, and a W-phase current, and are respectively generated in the first, second and third windings 14a, 14b and 14c. The alternating currents $I_{2a}$, $I_{2b}$ and $I_{2c}$ are respectively examples of a first alternating current having a first phase, a second alternating current having a second phase, and a third alternating current having a third phase. The alternating currents $I_{2a}$, $I_{2b}$ and $I_{2c}$ are outputted from the armature winding 14 to the rectifier element unit 21.

(2) Rotary Rectifier 4

As shown in FIG. 2, the rotary rectifier 4 includes the rectifier element unit 21 including a first to sixth rectifier elements 21a to 21f and a field winding 22.

The first and fourth rectifier elements 21a and 21d are connected in series, and a node between these rectifier elements is connected to the first winding 14a by a conductor 2. This conductor 2 is an example of one or more first conductors. The second and fifth rectifier elements 21b and 21e are connected in series, and a node between these rectifier elements is connected to the second winding 14b by a conductor 2. This conductor 2 is an example of one or more second conductors. The third and sixth rectifier elements 21c and 21f are connected in series, and a node between these rectifier elements is connected to the third winding 14c by a conductor 2. This conductor 2 is an example of one or more third conductors.

The pair of the first and fourth rectifier elements 21a and 21d, the pair of the second and fifth rectifier elements 21b and 21e, and the pair of the third and sixth rectifier elements 21c and 21f are connected in parallel with each other. These pairs are electrically connected to the field winding 22. Each of the first to the sixth rectifier elements 21a to 21f may include one diode or may include a plurality of diodes.

The first and fourth rectifier elements 21a and 21d rectify the alternating current $I_{2a}$, and convert the alternating current $I_{2a}$ into a direct current $I_{3a}$. The second and fifth rectifier elements 21b and 21e rectify the alternating current $I_{2b}$, and convert the alternating current $I_{2b}$ into a direct current $I_{3b}$. The third and sixth rectifier elements 21c and 21f rectify the alternating current $I_{2c}$, and convert the alternating current $I_{2c}$ into a direct current $I_{3c}$. The direct currents $I_{3a}$, $I_{3b}$ and $I_{3c}$ are examples of first, second and third direct currents, respectively.

In the rectifier element unit 21, the direct currents $I_{3a}$, $I_{3b}$ and $I_{3c}$ converge to a direct current $I_4$. The direct current $I_4$ is outputted from the rectifier element unit 21 to the field winding 22.

(3) Generator Main Body 5

As shown in FIG. 2, the generator of the present embodiment further includes a generator main body 5. The generator main body 5 is mounted on the rotating shaft 1. The generator main body 5 includes an armature winding (not shown) including first to third windings connected in Y shape.

When the direct current $I_4$ flows in the field winding 22, three-phase alternating currents are generated in the armature winding of the generator main body 5 by the effect of a magnetic field generated by the direct current $I_4$. In this way, the generator of the present embodiment can generate electric power.

Figure 3A:
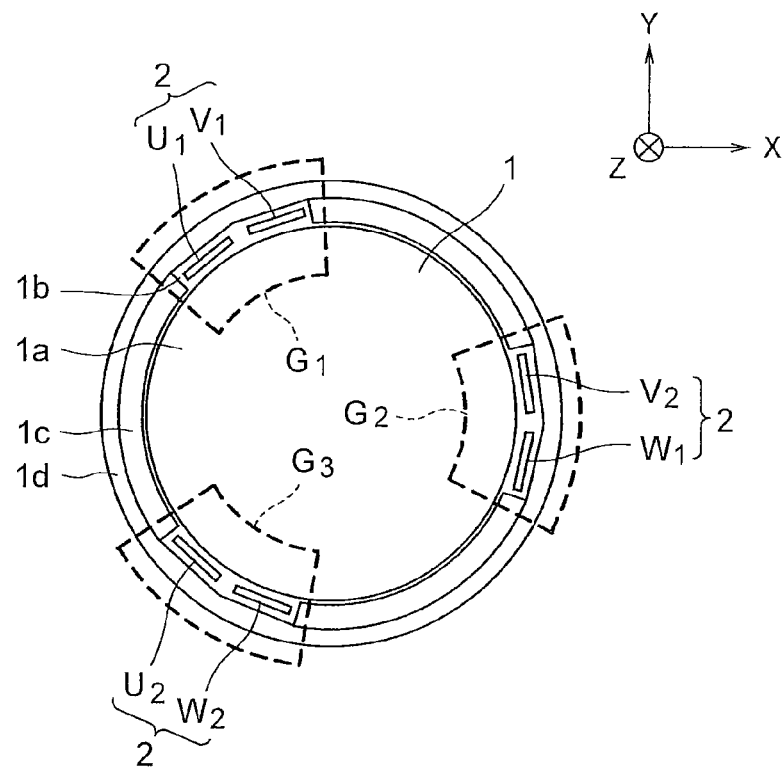
FIGS. 3A and 3B are cross-sectional views showing a conductor arrangement of the generator of the first embodiment.
Figure 3B:
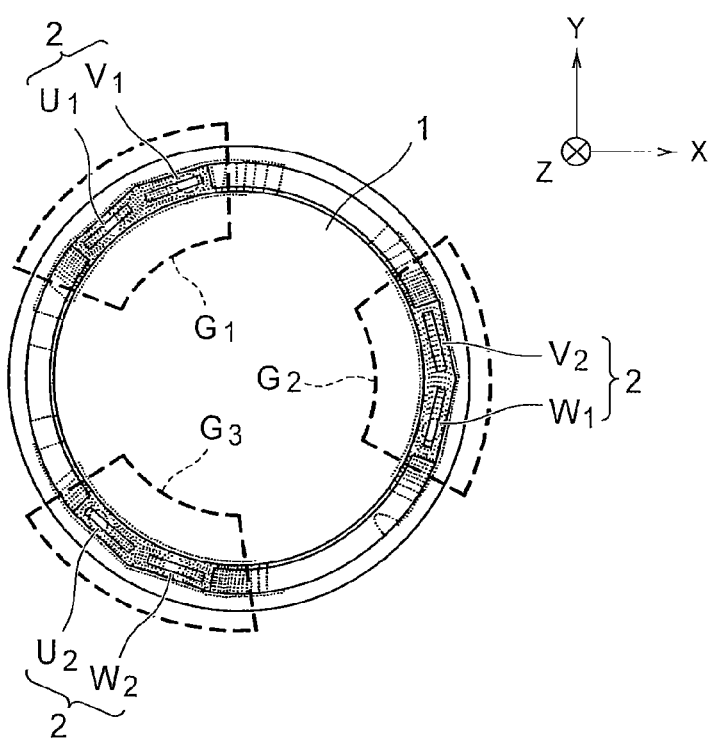

FIGS. 3A and 3B are cross-sectional views showing a conductor arrangement of the generator of the first embodiment. FIG. 3A is a cross-sectional view taken along line "A" shown in FIG. 1. FIG. 3B is a magnetic flux penetration line diagram corresponding to the cross-sectional view of FIG. 3A. FIG. 3B shows a calculation result obtained by a numerical calculation.

The rotating shaft 1 of the present embodiment includes a shaft 1a located at a center of the rotating shaft 1, and includes an insulator 1b, a first collector ring 1c and a second collector ring 1d which surround the shaft 1a in this order.

The shaft 1a is located on the inner circumferential side of the conductors 2. The insulator 1b surrounds the conductors 2 and electrically insulates the conductors 2 from each other. The first collector ring is located in the circumferential direction of the rotating shaft 1 with respect to the conductors 2. The second collector ring 1d is located on the outer circumferential side of the conductors 2. In the present embodiment, the shaft is and the second collector ring 1d are formed of magnetic materials, and the first collector ring 1c is formed of non-magnetic materials. The conductors 2 are formed of, for example, copper.

The conductors 2 of the present embodiment include first and second U-phase conductors $U_1$ and $U_2$ for passing the alternating current $I_{2a}$ (U-phase current), first and second V-phase conductors $V_1$ and $V_2$ for passing the alternating current $I_{2b}$ (V-phase current), and first and second W-phase conductors $W_1$ and $W_2$ for passing the alternating current $I_{2c}$ (W-phase current). The U-phase conductors $U_1$ and $U_2$, the V-phase conductors $V_1$ and $V_2$, and the W-phase conductors $W_1$ and $W_2$ are examples of one or more first conductors, one or more second conductors, and one or more third conductors, respectively. The conductors 2 having the same phase are connected in parallel with each other.

The conductors 2 of the present embodiment include one or more conductor groups $G_1$, $G_2$ and $G_3$, in each of which two or more conductors 2 are collectively arranged. Each of the conductor groups $G_1$, $G_2$ and $G_3$ includes two or more types of conductors 2 among the U-phase conductors, the V-phase conductors and the W-phase conductors.

The conductor group $G_1$ includes the first U-phase conductor $U_1$ and the first V-phase conductor $V_1$, so that the conductor group $G_1$ includes two types of conductors 2. The conductor group $G_1$ is an example of a first two-phase group. The first U-phase conductor $U_1$ and the first V-phase conductor $V_1$ are adjacent to each other in the circumferential direction of the rotating shaft 1. The conductor group $G_1$ includes one U-phase conductor and one V-phase conductor, so that the conductor group $G_1$ includes the same number of the U-phase and V-phase conductors. The conductor group $G_1$ includes no W-phase conductor.

The conductor group $G_2$ includes the second V-phase conductor $V_2$ and the first W-phase conductor $W_1$, so that the conductor group $G_2$ includes two types of conductors 2. The conductor group $G_2$ is an example of a second two-phase group. The second V-phase conductor $V_2$ and the first W-phase conductor $W_1$ are adjacent to each other in the circumferential direction of the rotating shaft 1. The conductor group $G_2$ includes one V-phase conductor and one W-phase conductor, so that the conductor group $G_2$ includes the same number of the V-phase and W-phase conductors. The conductor group $G_2$ includes no U-phase conductor.

The conductor group $G_3$ includes the second W-phase conductor $W_2$ and the second U-phase conductor $U_2$, so that the conductor group $G_3$ includes two types of conductors 2. The conductor group $G_3$ is an example of a third two-phase group. The second W-phase conductor $W_2$ and the second U-phase conductor $U_2$ are adjacent to each other in the circumferential direction of the rotating shaft 1. The conductor group $G_3$ includes one W-phase conductor and one U-phase conductor, so that the conductor group $G_3$ includes the same number of the W-phase and U-phase conductors. The conductor group $G_3$ includes no V-phase conductor.

In this manner, the conductors 2 of the present embodiment are collectively arranged in each of the conductor groups $G_1$, $G_2$ and $G_3$. The conductors 2 that belong to the same conductor group are arranged near each other. The insulator 1b lies between the conductors 2 that belong to the same conductor group. The conductor 2 that belongs to a certain conductor group is arranged away from the conductor 2 that belongs to another conductor group. The insulator 1b and the first collector ring 1c lie between the conductors 2 that belong to different conductor groups. The conductor groups $G_1$, $G_2$ and $G_3$ of the present embodiment are adjacent to each other in the circumferential direction of the rotating shaft 1, and are arranged at 120 degrees to each other. The conductor groups $G_1$, $G_2$ and $G_3$ are adjacent to each other with the first collector ring is in between them.

Next, a conductor arrangement of the generator of the first embodiment and a conductor arrangement of the conventional generator are compared with reference to FIGS. 3A, 3B, 7A and 7B.

As shown in FIGS. 7A and 7B, each conductor group $G_1$, $G_2$ and $G_3$ of the conventional generator includes only one type of conductors 2. Specifically, the conductor groups $G_1$, $G_2$ and $G_3$ respectively includes only U-phase conductors, only V-phase conductors, and only W-phase conductors.

On the other hand, as shown in FIGS. 3A and 3B, each conductor group $G_1$, $G_2$ and $G_3$ of the generator of the first embodiment includes two types of conductors 2. Therefore, when the alternating currents $I_{2a}$ to $I_{2c}$ flow in the conductors 2, a magnetic field generated around each conductor 2 is canceled by a magnetic field generated around the other conductor 2 in the same group. The reason of this is because in the present embodiment, the phases of the alternating currents flowing in the two conductors 2 in the same group are different from each other.

Therefore, according to the present embodiment, it is possible to prevent the power of the alternating currents $I_{2a}$ to $I_{2c}$ from being lost as heat. In other words, according to the present embodiment, it is possible to reduce the loss of power in the generator. Furthermore, according to the present embodiment, it is possible to prevent the generator structure near the conductors 2 from being heated.

FIGS. 3B and 7B show a magnetic flux penetration state in the generator of the first embodiment and a magnetic flux penetration state in the conventional generator. According to these calculation examples, it is known that the power loss in the generator of the first embodiment is about 40% of that of the conventional generator.

As described above, the conductors 2 of the present embodiment include one or more conductor groups $G_1$ to $G_3$ in each of which two or more conductors 2 are collectively arranged, and each of the conductor groups $G_1$ to $G_3$ includes two or more types of conductors 2 among the U-phase conductors, the V-phase conductors and the W-phase conductors. Therefore, according to the present embodiment, it is possible to prevent the generator structure from being heated by the alternating currents $I_{2a}$ to $I_{2c}$.

The conductor groups $G_1$, $G_2$ and $G_3$ of the present embodiment need not be arranged at 120 degrees to each other if the conductor groups $G_1$, $G_2$ and $G_3$ are arranged away from each other. However, when the conductor groups $G_1$, $G_2$ and $G_3$ are arranged at 120 degrees to each other, there is an advantage that, for example, it is possible to prevent the center of gravity of the rotor from shifting.

Furthermore, in the conductor group $G_1$ of the present embodiment, the positions of the first U-phase conductor $U_1$ and the first V-phase conductor $V_1$ may be exchanged. In the same manner, in the conductor group $G_2$ of the present embodiment, the positions of the second V-phase conductor $V_2$ and the first W-phase conductor $W_1$ may be exchanged. In the same manner, in the conductor group $G_3$ of the present embodiment, the positions of the second W-phase conductor $W_2$ and the second U-phase conductor $U_2$ may be exchanged.

Each of the conductor groups $G_1$ to $G_3$ of the present embodiment may include two types of conductors 2 and three or more conductors 2. In this case, the conductor group $G_1$ may include different numbers of the U-phase and V-phase conductors. In the same manner, the conductor group $G_2$ may include different numbers of the V-phase and W-phase conductors. In the same manner, the conductor group $G_3$ may include different numbers of the W-phase and U-phase conductors. However, when each of the conductor groups $G_1$, $G_2$ and $G_3$ include the same number of two types of conductors 2, there is an advantage that, for example, magnetic fields around the conductors 2 can be easily cancelled.

Second Embodiment

Figure 4A:
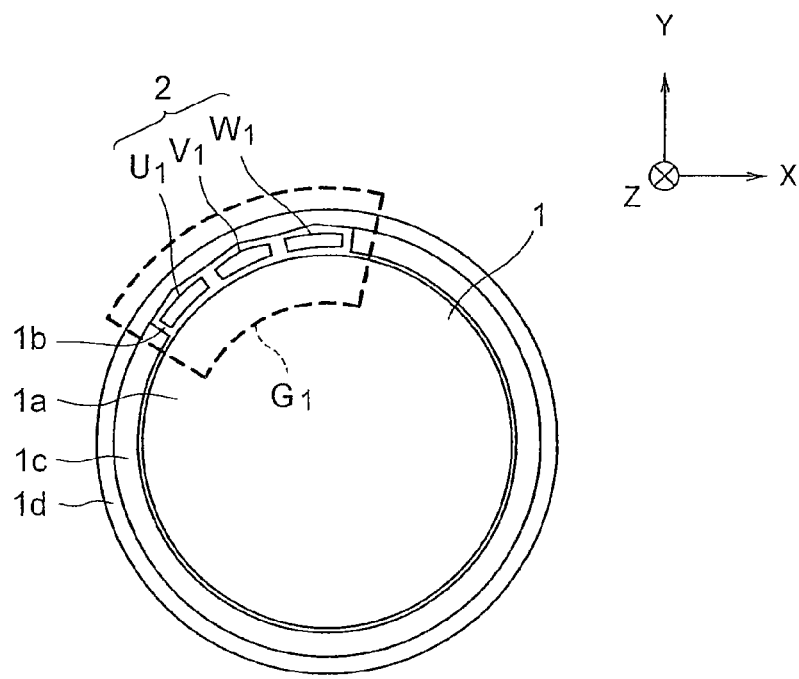
FIGS. 4A and 4B are cross-sectional views showing a conductor arrangement of a generator of a second embodiment.
Figure 4B:
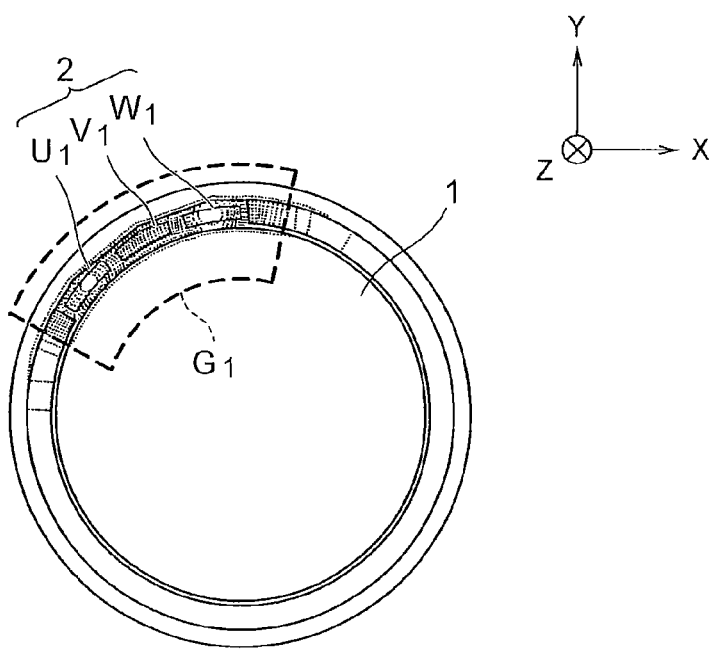

FIGS. 4A and 4B are cross-sectional views showing a conductor arrangement of a generator of a second embodiment.

The conductors 2 of the present embodiment include a U-phase conductor $U_1$ for passing the alternating current $I_{2a}$ (U-phase current), a V-phase conductor $V_1$ for passing the alternating current $I_{2b}$ (V-phase current), and a W-phase conductor $W_1$ for passing the alternating current $I_{2c}$ (W-phase current). The U-phase conductor $U_1$, the V-phase conductor $V_1$ and the W-phase conductor $W_1$ are examples of one or more first conductors, one or more second conductors and one or more third conductors, respectively.

The conductors 2 of the present embodiment include a conductor group $G_1$ in which two or more conductors 2 are collectively arranged. The conductor group $G_1$ includes the U-phase conductor $U_1$, the V-phase conductor $V_1$ and the W-phase conductor $W_1$, so that the conductor group $G_1$ includes all of the three types of conductors 2. The conductor group $G_1$ is an example of a three-phase group. The U-phase conductor $U_1$, the V-phase conductor $V_1$ and the W-phase conductor $W_1$ are adjacent to each other in the circumferential direction of the rotating shaft 1. The conductor group $G_1$ includes one U-phase conductor, one V-phase conductor and one W-phase conductor, so that the conductor group $G_1$ includes the same number of the U-phase, V-phase and W-phase conductors.

The conductor group $G_1$ of the generator of the present embodiment includes three types of conductors 2. Therefore, when the alternating currents $I_{2a}$ to $I_{2c}$ flow in the conductors 2, a magnetic field generated around each conductor 2 is canceled by magnetic fields generated around the other two conductors 2. The reason of this is because the phases of the alternating currents flowing in the three conductors 2 in the conductor group $G_1$ are different from each other. Therefore, according to the present embodiment, it is possible to reduce the loss of power in the generator and prevent the generator structure near the conductors 2 from being heated.

As described above, the conductors 2 of the present embodiment include the conductor group $G_1$ in which two or more conductors 2 are collectively arranged, and the conductor group $G_1$ includes three types of conductors 2 including the U-phase, V-phase and the W-phase conductors. Therefore, according to the present embodiment, it is possible to prevent the generator structure from being heated by the alternating currents $I_{2a}$ to $I_{2c}$.

In the conductor group $G_1$ of the present embodiment, the positions of the U-phase conductor $U_1$, the V-phase conductor $V_1$, and the W-phase conductor $W_1$ may be replaced with each other.

The conductor group $G_1$ of the present embodiment may include three types of conductors 2 and four or more conductors 2. In this case, the conductor group $G_1$ may include different numbers of the U-phase, V-phase and W-phase conductors. However, when the conductor group $C_1$ includes the same number of three types of conductors 2, there is an advantage that, for example, magnetic fields around the conductors 2 can be easily cancelled.

Third Embodiment

Figure 5A:
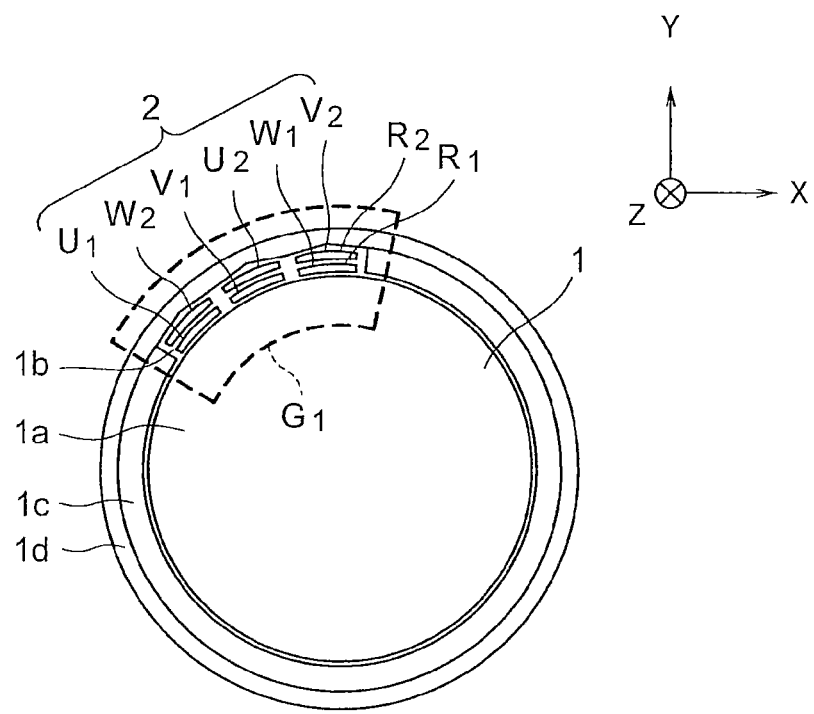
FIGS. 5A and 5B are cross-sectional views showing a conductor arrangement of a generator of a third embodiment.
Figure 5B:
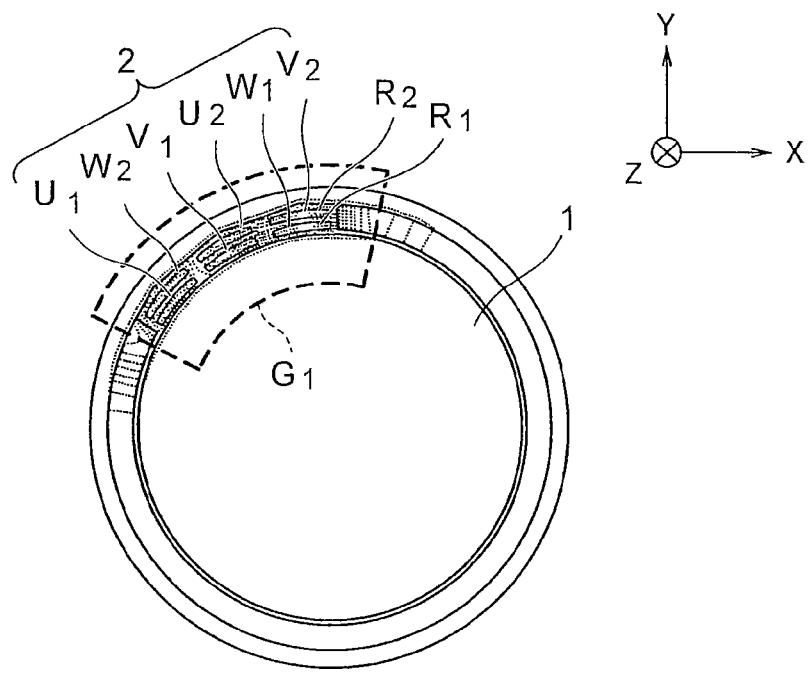

FIGS. 5A and 5B are cross-sectional views showing a conductor arrangement of a generator of a third embodiment.

The conductors 2 of the present embodiment include first and second U-phase conductors $U_1$ and $U_2$ for passing the alternating current $I_{2a}$ (U-phase current), first and second V-phase conductors $V_1$ and $V_2$ for passing the alternating current $I_{2b}$ (V-phase current), and first and second W-phase conductors $W_1$ and $W_2$ for passing the alternating current $I_{2c}$ (W-phase current). The U-phase conductors $U_1$ and $U_2$, the V-phase conductors $V_1$ and $V_2$ and the W-phase conductors $W_1$ and $W_2$ are examples of one or more first conductors, one or more second conductors, and one or more third conductors, respectively.

The conductors 2 of the present embodiment include a conductor group $G_1$ in which two or more conductors 2 are collectively arranged. The conductor group $G_1$ includes the first and the second U-phase conductors $U_1$ and $U_2$, the first and the second V-phase conductors $V_1$ and $V_2$, and the first and the second W-phase conductor $W_1$ and $W_2$, so that the conductor group $G_1$ includes all of the three types of conductors 2. The conductor group $G_1$ is an example of a three-phase group. The conductor group $G_1$ includes two U-phase conductors, two V-phase conductors and two W-phase conductors, so that the conductor group $G_1$ includes the same number of the U-phase, V-phase and W-phase conductors.

The conductor group $G_1$ of the present embodiment includes a first row $R_1$ in which the first U-phase conductor $U_1$, the first V-phase conductor $V_1$ and the first W-phase conductor $W_1$ are adjacent to each other in the circumferential direction of the rotating shaft 1. The conductor group $G_1$ of the present embodiment further includes a second row $R_2$ in which the second U-phase conductor $U_2$, the second V-phase conductor $V_2$ and the second W-phase conductor $W_2$ are adjacent to each other in the circumferential direction of the rotating shaft 1. The second row $R_2$ is adjacent to the first row $R_1$ in the radial direction of the rotating shaft 1. The second U-phase conductor $U_2$, the second V-phase conductor $V_2$ and the second W-phase conductor $W_2$ are respectively adjacent to the first V-phase conductor $V_1$, the first W-phase conductor $W_1$ and the first U-phase conductor $U_1$ in the radial direction of the rotating shaft 1.

The second U-phase conductor $U_2$, the second V-phase conductor $V_2$ and the second W-phase conductor $W_2$ may be respectively adjacent to the first W-phase conductor $W_1$, the first U-phase conductor $U_1$ and the first V-phase conductor $V_1$ in the radial direction of the rotating shaft 1.

The conductor group $G_1$ of the generator of the present embodiment includes three types of conductors 2. Therefore, when the alternating currents $I_{2a}$ to $I_{2c}$ flow in the conductors 2, a magnetic field generated around each conductor 2 is canceled by magnetic fields generated around the other five conductors 2. The reason of this is because the phases of the alternating currents flowing in the three types of conductors 2 in the conductor group $G_1$ are different from each other. Therefore, according to the present embodiment, it is possible to reduce the loss of power in the generator and prevent the generator structure near the conductors 2 from being heated.

Each of the conductors 2 in the second row $R_2$ of the present embodiment is adjacent to a different type of conductor 2 in the first row $R_1$. Therefore, according to the present embodiment, the magnetic field generated around each conductor 2 can be more easily cancelled.

As described above, the conductors 2 of the present embodiment include the conductor group $G_1$ in which two or more conductors 2 are collectively arranged, and the conductor group $G_1$ includes three types of conductors 2 including the U-phase, V-phase and W-phase conductors. Therefore, according to the present embodiment, it is possible to prevent the generator structure from being heated by the alternating currents $I_{2a}$ to $I_{2c}$.

The configuration of the conductor group $G_1$ including the first and the second rows $R_1$ and $R_2$ may be applied to the first embodiment. For example, the conductor group $G_1$ of the first embodiment may include a first row $R_1$ in which an U-phase conductor and a V-phase conductor are adjacent to each other in the circumferential direction, and a second row $R_2$ in which an U-phase conductor and a V-phase conductor are adjacent to each other in the circumferential direction and which is adjacent to the first row $R_1$ in the radial direction. In this case, each of the conductors 2 in the second row $R_2$ is desired to be adjacent to a different type of conductor 2 in the first row $R_1$.

Fourth Embodiment

Figure 6A:
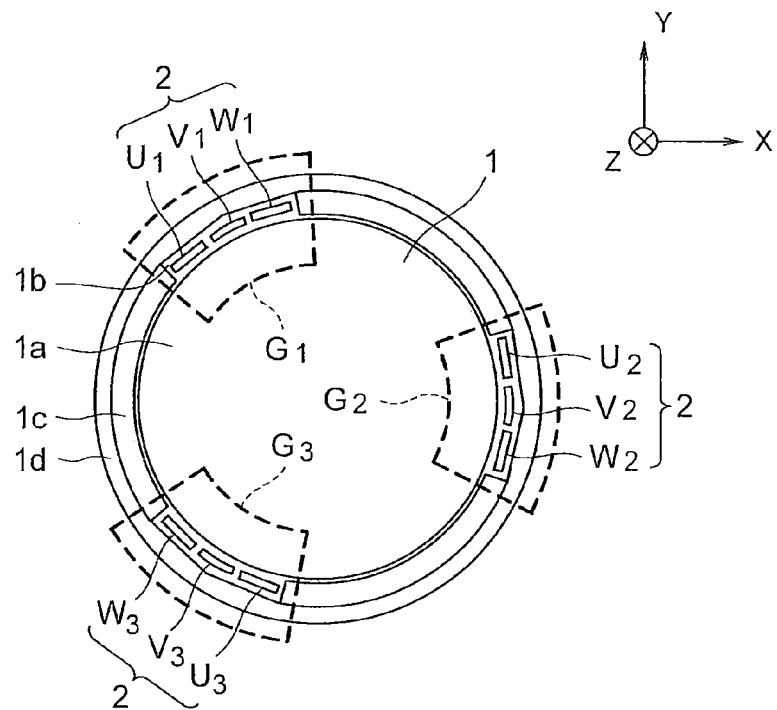
FIGS. 6A and 6B are cross-sectional views showing a conductor arrangement of a generator of a fourth embodiment.
Figure 6B:
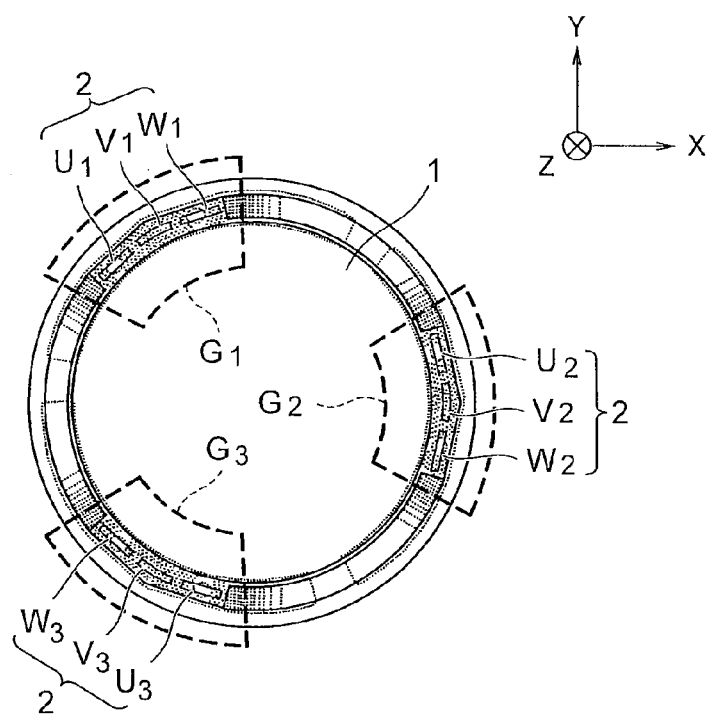

FIGS. 6A and 6B are cross-sectional views showing a conductor arrangement of a generator of a fourth embodiment.

The conductors 2 of the present embodiment include first to third U-phase conductors $U_1$ to $U_3$ for passing the alternating current $I_{2a}$ (U-phase current), first to third V-phase conductors $V_1$ to $V_3$ for passing the alternating current $I_{2b}$ (V-phase current), and first to third W-phase conductors $W_1$ to $W_3$ for passing the alternating current $I_{2c}$ (W-phase current). The U-phase conductors $U_1$ to $U_3$, the V-phase conductors $V_1$ to $V_3$ and the W-phase conductors $W_1$ to $W_3$ are examples of one or more first conductors, one or more second conductors, and one or more third conductors, respectively.

The conductors 2 of the present embodiment include one or more conductor groups $G_1$, $G_2$ and $G_3$, in each of which two or more conductors 2 are collectively arranged. Each of the conductor groups $G_1$, $G_2$ and $G_3$ includes three types of conductors 2 including the U-phase, V-phase and W-phase conductors. The conductor groups $G_1$, $G_2$ and $G_3$ are examples of a three-phase group.

The conductor group $G_1$ includes the first U-phase conductor $U_1$, the first V-phase conductor $V_1$ and the first W-phase conductor $W_1$, so that the conductor group $G_1$ includes all of the three types of conductors 2. These conductors 2 are adjacent to each other in the circumferential direction of the rotating shaft 1. The conductor group $G_1$ includes one U-phase conductor, one V-phase conductor and one W-phase conductor, so that the conductor group $G_1$ includes the same number of the U-phase, V-phase and W-phase conductors.

The conductor group $G_2$ includes the second U-phase conductor $U_2$, the second V-phase conductor $V_2$ and the second W-phase conductor $W_2$, so that the conductor group $G_2$ includes all of the three types of conductors 2. These conductors 2 are adjacent to each other in the circumferential direction of the rotating shaft 1. The conductor group $G_2$ includes one U-phase conductor, one V-phase conductor and one W-phase conductor, so that the conductor group $G_2$ includes the same number of the U-phase, V-phase and W-phase conductors.

The conductor group $G_3$ includes the third U-phase conductor $U_3$, the third V-phase conductor $V_3$ and the third W-phase conductor $W_3$, so that the conductor group $G_3$ includes all of the three types of conductors 2. These conductors 2 are adjacent to each other in the circumferential direction of the rotating shaft 1. The conductor group $G_3$ includes one U-phase conductor, one V-phase conductor and one W-phase conductor, so that the conductor group $G_3$ includes the same number of the U-phase, V-phase and W-phase conductors.

In this manner, the conductors 2 of the present embodiment are collectively arranged in each of the conductor groups $G_1$, $G_2$ and $G_3$. The conductors 2 that belong to the same conductor group are arranged near each other. The conductor 2 that belongs to a certain conductor group is arranged away from the conductor 2 that belongs to another conductor group. The conductor groups $G_1$, $G_2$ and $G_3$ of the present embodiment are adjacent to each other in the circumferential direction of the rotating shaft 1, and are arranged at 120 degrees to each other.

Each of the conductor groups $G_1$ to $G_3$ of the generator of the present embodiment includes three types of conductors 2. Therefore, when the alternating currents $I_{2a}$ to $I_{2c}$ flow in the conductors 2, a magnetic field generated around each conductor 2 is canceled by magnetic fields generated around the other two conductors 2 in the same group. The reason of this is because the phases of the alternating currents flowing in the three conductors 2 in the same group are different from each other. Therefore, according to the present embodiment, it is possible to reduce the loss of power in the generator and prevent the generator structure near the conductors 2 from being heated.

As described above, the conductors 2 of the present embodiment include one or more conductor groups $G_1$ to $G_3$ in which two or more conductors 2 are collectively arranged, and each of the conductor groups $G_1$ to $G_3$ includes three types of conductors 2 including the U-phase, V-phase and W-phase conductors. Therefore, according to the present embodiment, it is possible to prevent the generator structure from being heated by the alternating currents $I_{2a}$ to $I_{2c}$.

The conductor groups $G_1$, $G_2$ and $G_3$ of the present embodiment need not be arranged at 120 degrees to each other if the conductor groups $G_1$, $G_2$ and $G_3$ are arranged away from each other. However, when the conductor groups $G_1$, $G_2$ and $G_3$ are arranged at 120 degrees to each other, there is an advantage that, for example, it is possible to prevent the center of gravity of the rotor from shifting.

In the first and fourth embodiments, the number of conductor groups may be other than three. In the same manner, in the second and third embodiments, the number of conductor groups may be other than one. For example, when one generator includes N conductor groups (N is an integer greater than or equal to 2), it is desired that these conductor groups are arranged adjacent to each other in the circumferential direction of the rotating shaft 1 and are arranged at 360/N degrees to each other.

The configurations of the first to fourth embodiments may be combined with each other. For example, one generator may include both a conductor group including two types of conductors 2 and a conductor group including three types of conductors 2.

While certain embodiments have been described, these embodiments have been presented by way of example only, and are not intended to limit the scope of the inventions. Indeed, the novel generators described herein may be embodied in a variety of other forms; furthermore, various omissions, substitutions and changes in the form of the generators described herein may be made without departing from the spirit of the inventions. The accompanying claims and their equivalents are intended to cover such forms or modifications as would fall within the scope and spirit of the inventions.

The invention claimed is:

1. A generator comprising:
    an alternating current exciter configured to output a first alternating current having a first phase, a second alternating current having a second phase, and a third alternating current having a third phase;
    a rotary rectifier configured to convert the first, second and third alternating currents into first, second and third direct currents, respectively;
    a rotating shaft on which the alternating current exciter and the rotary rectifier are mounted; and
    a plurality of conductors mounted on the rotating shaft, arranged between the alternating current exciter and the rotary rectifier, and including two or more first conductors, two or more second conductors and two or more third conductors to respectively supply the first, second and third alternating currents from the alternating current exciter to the rotary rectifier,
    wherein the plurality of conductors include three or more conductor groups in each of which two or more conductors are collectively arranged, each of the conductor groups includes the two or more conductors arranged to cancel a magnetic field around each conductor in the same group, and the conductor groups are arranged separated from one another on the rotating shaft.

2. The generator of claim 1, wherein each of the conductor groups includes two or more types of conductors among the first, second and third conductors.

3. The generator of claim 1, wherein the conductor groups include:
- a first two-phase group including the first and second conductors and including no third conductor;
- a second two-phase group including the second and third conductors and including no first conductor; and
- a third two-phase group including the third and first conductors and including no second conductor.

4. The generator of claim 3, wherein
the first two-phase group includes the same number of the first and second conductors,
the second two-phase group includes the same number of second and third conductors, and
the third two-phase group includes the same number of the third and first conductors.

5. The generator of claim 1, wherein the conductor groups include one or more three-phase groups, each of which includes the first, second, and third conductors.

6. The generator of claim 5, wherein at least one of the three-phase groups includes the same number of the first, second and third conductors.

7. The generator of claim 5, wherein at least one of the three-phase groups includes:
- a first row in which the first, second and third conductors are adjacent to each other in a circumferential direction of the rotating shaft; and
- a second row in which the first, second and third conductors are adjacent to each other in the circumferential direction of the rotating shaft, the second row being adjacent to the first row in a radial direction of the rotating shaft.

8. The generator of claim 7, wherein
the first conductor in the second row is adjacent to the second or third conductor in the first row,
the second conductor in the second row is adjacent to the third or first conductor in the first row, and
the third conductor in the second row is adjacent to the first or second conductor in the first row.

9. The generator of claim 1, wherein at least one of the conductor groups includes:
- a first row in which the conductors are adjacent to each other in a circumferential direction of the rotating shaft; and
- a second row in which the conductors are adjacent to each other in the circumferential direction of the rotating shaft, the second row being adjacent to the first row in a radial direction of the rotating shaft.

10. The generator of claim 9, wherein each conductor in the second row is adjacent to a different type of conductor in the first row.

11. The generator of claim 3, wherein the first, second, and third two-phase groups are arranged at 120 degrees to each other.

* * * * *